United States Patent [19]

Yamane et al.

[11] Patent Number: 5,248,521
[45] Date of Patent: Sep. 28, 1993

[54] METHOD FOR REPAIRING A COATING SURFACE

[75] Inventors: Takakazu Yamane; Tadamitsu Nakahama; Yoshio Tanimoto, all of Hiroshima, Japan

[73] Assignee: Mazda Motor Corporation, Hiroshima, Japan

[21] Appl. No.: 582,123

[22] Filed: Sep. 13, 1990

Related U.S. Application Data

[63] Continuation of Ser. No. 371,830, Jun. 27, 1989, abandoned.

[30] Foreign Application Priority Data

Jun. 27, 1988 [JP] Japan .................. 63-156843

[51] Int. Cl.[5] .......................... B32B 35/00; B05D 3/12
[52] U.S. Cl. ................................. 427/140; 427/355; 427/369
[58] Field of Search ............. 427/11, 140, 355, 369, 427/429, 180, 190

[56] References Cited

U.S. PATENT DOCUMENTS

| | | | |
|---|---|---|---|
| 3,700,505 | 10/1972 | Kanter | 427/11 |
| 3,874,899 | 4/1975 | Miszenti et al. | 427/11 |
| 3,985,598 | 10/1976 | Trenda et al. | 427/140 |
| 4,018,944 | 4/1977 | Hallstrom et al. | 427/140 |
| 4,039,726 | 8/1977 | Carr et al. | 427/140 |
| 4,311,489 | 1/1982 | Kressner | 51/298 |
| 4,804,562 | 2/1989 | Ferguson et al. | 427/140 |

FOREIGN PATENT DOCUMENTS 61-50766  3/1986  Japan .

OTHER PUBLICATIONS

Lowenheim, "Electroplating", Chapter 6, McGraw-Hill Book Company 1978, pp. 93–98.

*Primary Examiner*—Roy King
*Attorney, Agent, or Firm*—Fish & Richardson

[57] ABSTRACT

A method for repairing the surface of a coating involves the step of rubbing a compound having a Vickers hardness of above Hv 2,000 g/mm$^2$ on the surface of the coating with a buff at a uniform surface pressure ranging from 2 to 20 g/cm$^2$. This method permits the repair of scratched or scraped coating surfaces to produce coating surfaces of high quality without causing fade on the surfaces.

6 Claims, 9 Drawing Sheets

METHOD FOR REPAIRING A COATING SURFACE

This application is a continuation of U.S. application Ser. No. 07/371,830, filed Jun. 27, 1989 now abandoned.

BACKGROUND OF THE INVENTION

1. Field of the Invention

The present invention relates to a method for repairing the surface of a coating to provide a coating surface with a high degree of smoothness.

2. Description of Related Art

Recently, as there is the growing tendency that a finish and a gloss on the surface of a coating have been remarkably improved, a scrape or a scratch marked on the surface of a coating with a paint dark in color, such as black, brown and gray is particularly striking. It is thus required that such a scrape or scratch marked on a coating surface of a vehicle be repaired by removing a site of the scrape or scratch and re-forming a coating surface that does not show the scrape or scratch and that looks substantially the same as the original coating surface.

Procedures of repairing a coating surface with scrapes or scratch usually comprises a paper rubbing step, a so-called compound rubbing step, and a finish rubbing step. In the paper rubbing step, wet rubbing papers are usually employed to remove by wet-rubbing portions of a coating surface where dirts adhere or where a paint fades or it solidifies in a state in which drips or sags of the paint remain as they are. The compound rubbing step comprises a rough rubbing and an intermediate rubbing with a cotton buff or a wool buff, using a compound including, for example, one as disclosed in U.S. Pat. No. 4,311,489. The finish rubbing step is to finish a coating surface with a wool buff using a compound having particle sizes smaller than those of the compound used in the compound rubbing step.

It can be noted, however, that such a conventional repairing method as have been described hereinabove rather may mark smaller scrapes or scratches on a coating surface to be repaired, thus causing a fade by diffused reflection of light on a surface of the coating which has been rubbed. Accordingly, it becomes so difficult that such a conventional method can recover a scraped or scratched coating surface to an original state, so that scrapes or scratches are repaired by re-painting.

SUMMARY OF THE INVENTION

Therefore, the present invention has the object to provide a method for repairing the surface of a coating, which can remove a scrape or scratch on the coating surface and recover the scraped or scratched coating surface to an original state causing no fade on a surface of the coating which is rubbed.

In order to achieve the object, the present invention consists of a method for repairing a coating surface comprising acting a compound with a Vickers hardness of Hv 2,000 g/mm$^2$, or higher on the coating surface at a uniform surface pressure in the range from 2 to 20 g/cm$^2$ in a finish rubbing step.

BRIEF DESCRIPTION OF THE DRAWINGS

Other objects, features and advantages of the present invention will become apparent in the course of the description of the preferred embodiments which follow in this specification when read or interpreted in light of the accompanying drawings, in which.

DETAILED DESCRIPTION OF THE PREFERRED EMBODIMENTS

Figure 1:
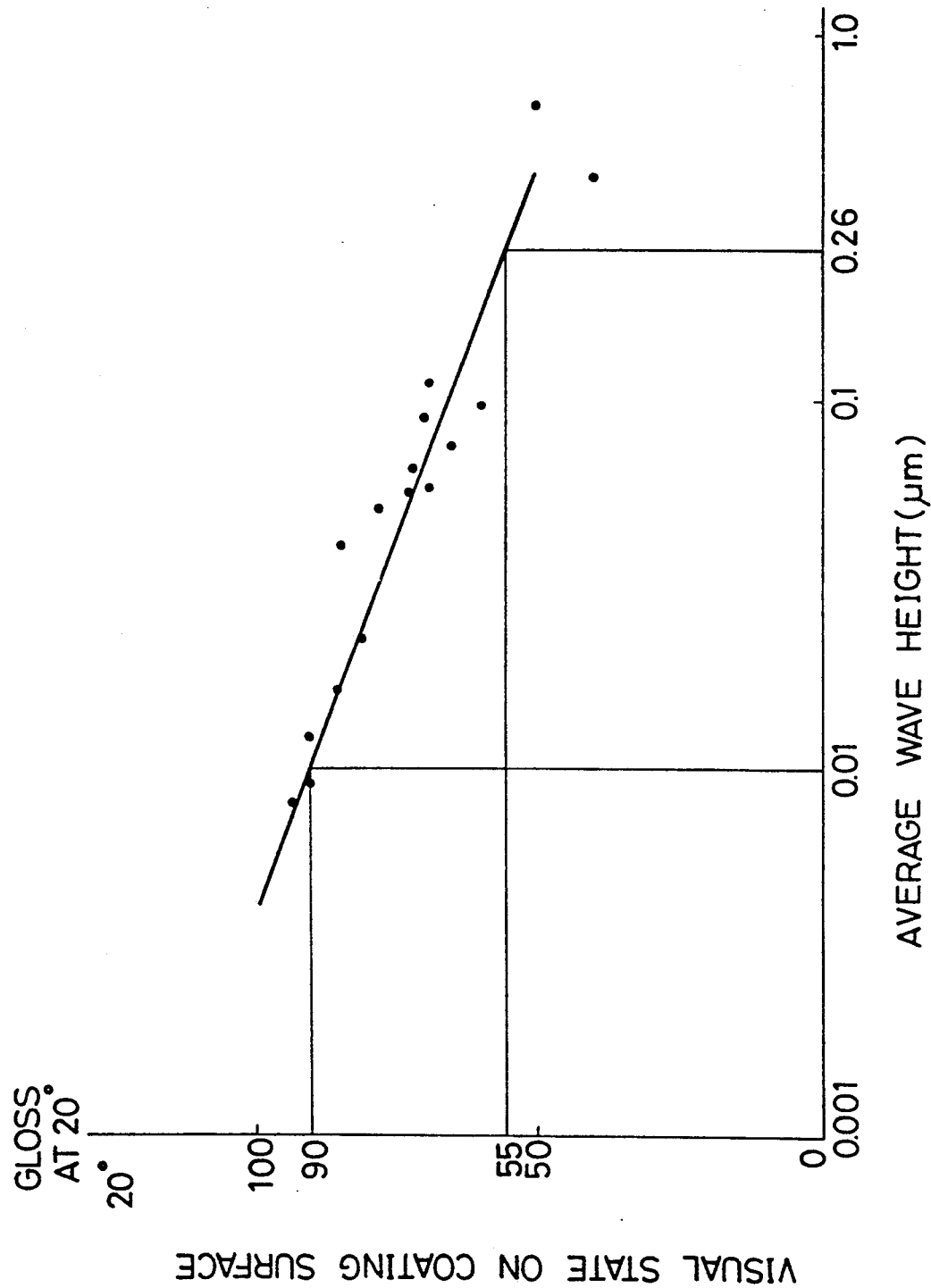
FIG. 1 is a graph showing characteristics showing a relation of a visual state (or a gloss at the angle of 20°) on a coating surface vs. an average wave height in a wavelength area below 100 μm.

It has been found that there is an interrelation between an average wave height of a wavelength range below 100 μm and a visual observation for a gloss at the angle of 20°. More specifically, it has been found from the graph as shown in FIG. 1 that scrapes or scratches may be visually observed when the gloss at 20° is lower than 55, a range in which a paint fades after polishing may be visually observed when the gloss at 20° is in the range from 55 to 90, and a normal coating surface is visually observed when the gloss at 20° is higher than 90—in other words, a normal coating has a surface with an average wave height being 0.01 μm in a range of wavelength of 100 μm or smaller. It has now been found that the gloss at 20° of more than 90 can be achieved by acting a compound having a Vickers hardness of Hv 2,000 kg/mm$^2$ or higher at a uniform surface pressure ranging from 2 to 20 g/cm$^2$ directly upon a coating surface in the step of finish rubbing.

In accordance with the present invention, the method for repairing the surface of a coating with scrapes or scratches comprises the finish rubbing step which is carried out by the so-called compound rubbing step comprising rough rubbing and intermediate rubbing.

The compound rubbing step is usually carried out using a compound having a particle size larger than that of the compound to be used in the finish rubbing step according to the present invention. It is furthermore to be noted that the compound to be used in the intermediate rubbing has a particle size smaller than that to be used in the rough rubbing.

Figure 3:
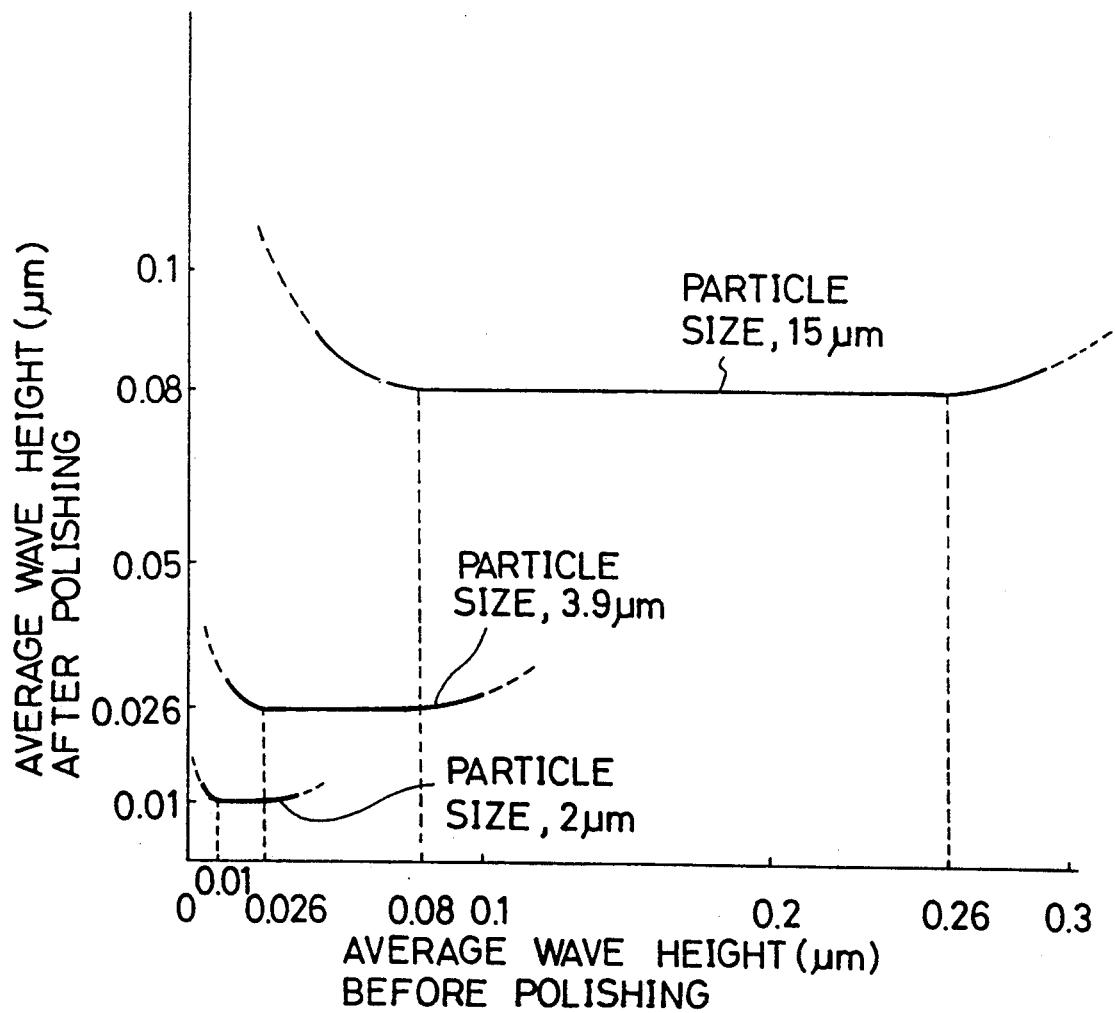
FIG. 3 is a graph showing characteristics exerting an influence of particle sizes of a compound upon an average wave height on coating surfaces subsequent to a polishing when compared with prior to polishing, when a urethane foam buff is used.
Figure 4:
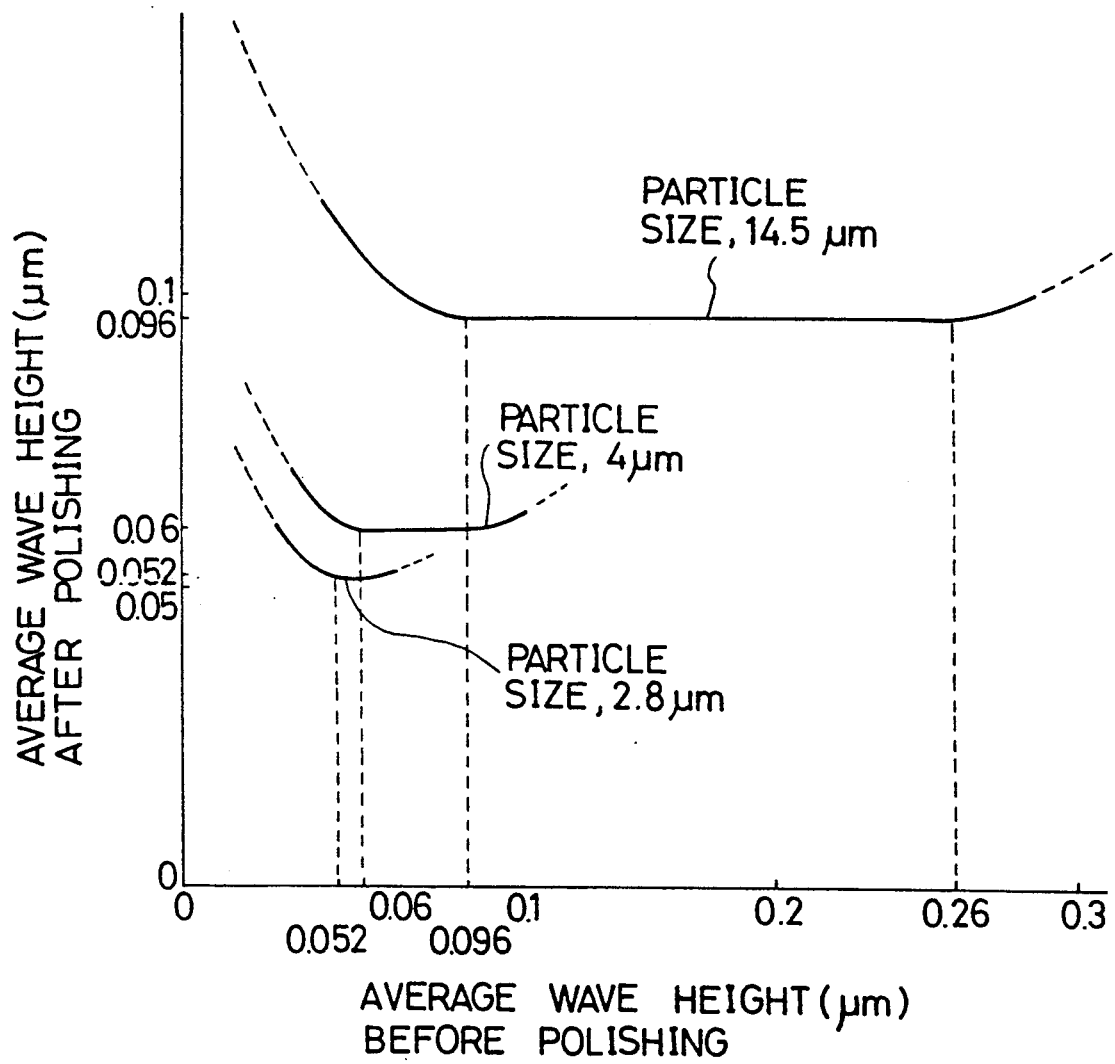
FIG. 4 is a graph showing characteristics exerting an influence of particle sizes of a compound upon an average wave height on coating surfaces subsequent to a polishing when compared with prior to polishing, when a cotton buff is used.
Figure 5:
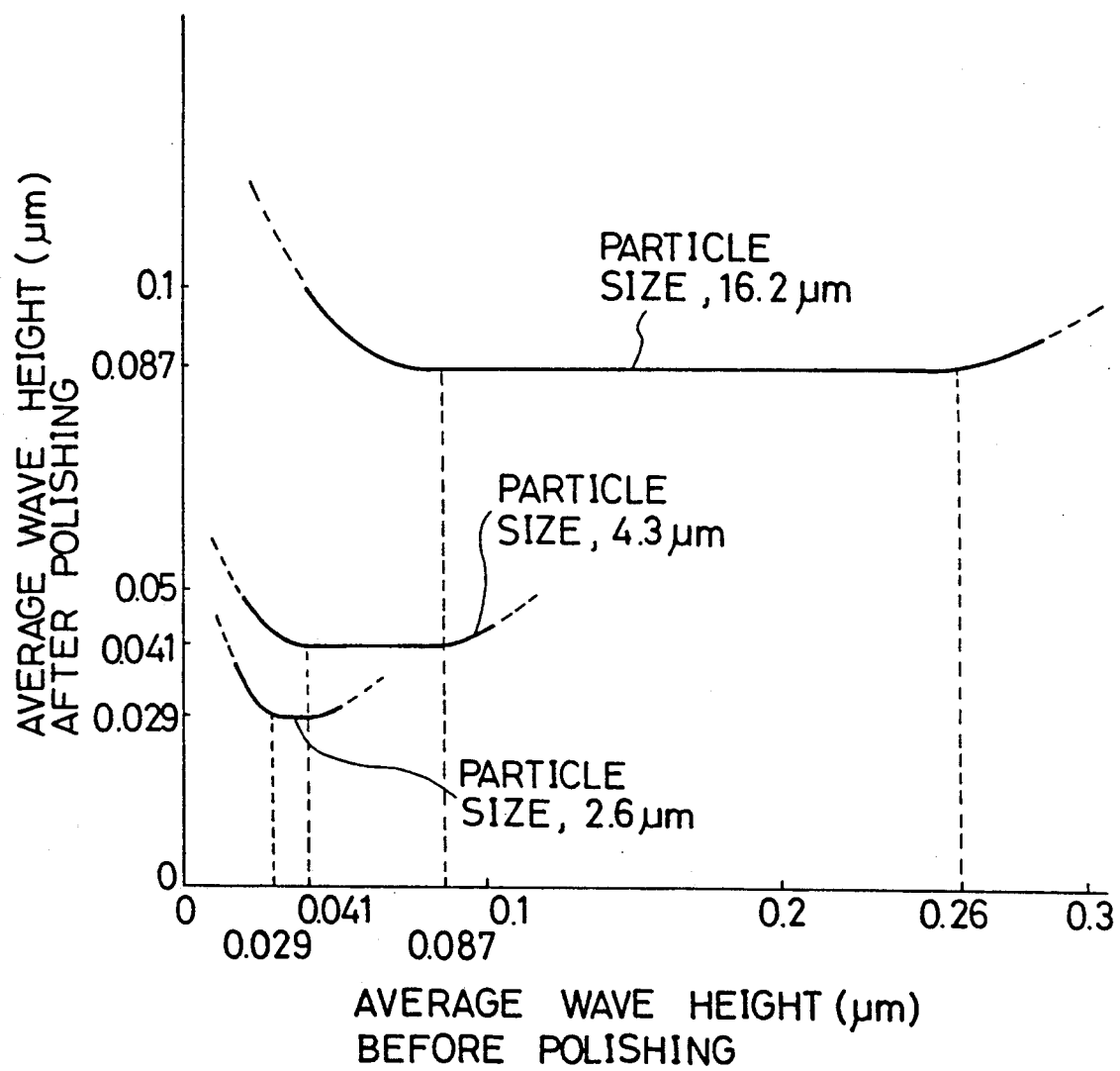
FIG. 5 is a graph showing characteristics exerting an influence of particle sizes of a compound upon an average wave height on coating surfaces subsequent to a polishing when compared with prior to polishing, when a wool buff is used.

FIGS. 3 to 5 show the results experimentally obtained with respect to the relation of the average wave height below a wavelength of 100 μm before polishing with the average wave height therebelow after polishing, using a urethane foam buff, a cotton buff, and a wool buff, respectively. The results are shown to be substantially the same in the tendency. It is thus to be noted that a description is made which is restricted herein to the results obtained using the urethane foam buff, but it is to be understood that the present invention is considered in any respect as not restrictive thereto.

Referring now to FIG. 3 which shows the relation of the average wave heights on the surface of a coating polished with a urethane foam buff after polishing with that before polishing, it is found that, for the compound having particle sizes of 15 μm, an average wave height is in the range from approximately 0.26 to 0.08 μm prior to polishing, resulting in the average wave height on the polished surface to a uniform level as high as 0.08 μm, while the average wave height on the polished coating surface was somewhat larger than 0.08 μm when the compound was used having particle sizes larger than about 0.26 μm or smaller than 0.08 μm. This means that, when the compound having particle sizes of 15 μm is used for polishing the coating surface having an average wave height in the range of approximately 0.26 to 0.08 μm, a limit for repairing the coating surface in a polishing time at the rate of 2 minutes per square meters is placed upon the average wave height of 0.08 μm subsequent to polishing, while the polishing time of 2 minutes per square meters is insufficient if an average wave height on the surface of a coating is larger than 0.26 μm, on the one hand, and the coating surface is scratched by the compound on the basis of their particle sizes when the average wave height on the coating surface prior to polishing is approximately 0.08 μm or lower. In this case, if the average wave height prior to polishing is lower than 0.08 μm, the use of the compound having the largest particle size of 15 μm poses no problems because their particle sizes are reduced to smaller sizes as the polishing proceeds.

When the compound is used having an average particle size of 3.9 μm, the average wave height after polishing on a surface of the coating becomes constant at 0.026 μm for the average wave height before polishing being in the range from approximately 0.08 to 0.026 μm, on the one hand, while the average wave height after polishing becomes somewhat larger than 0.026 μm when the average wave height before polishing is larger than approximately 0.08 μm or smaller than approximately 0.26 μm, on the other hand. When the compound is used having an average particle size of 2 μm, the average wave height after polishing becomes constant at 0.01 μm for the average wave height before polishing in the range from 0.026 to 0.01 μm, while the average wave height after polishing becomes somewhat larger than 0.01 μm for the average wave height before polishing in the range larger than approximately 0.026 μm or in the range smaller than approximately 0.01 μm.

It is to be noted herein that characteristics lines may be produced by the urethane foam buff, which show the relation of the average wave height prior to polishing with that subsequent to polishing by plotting the constant average wave heights on the coating surface after polishing and the upper limits of the average wave heights before polishing which give the constant average wave heights for each of the particle sizes of the compounds.

Figure 6:
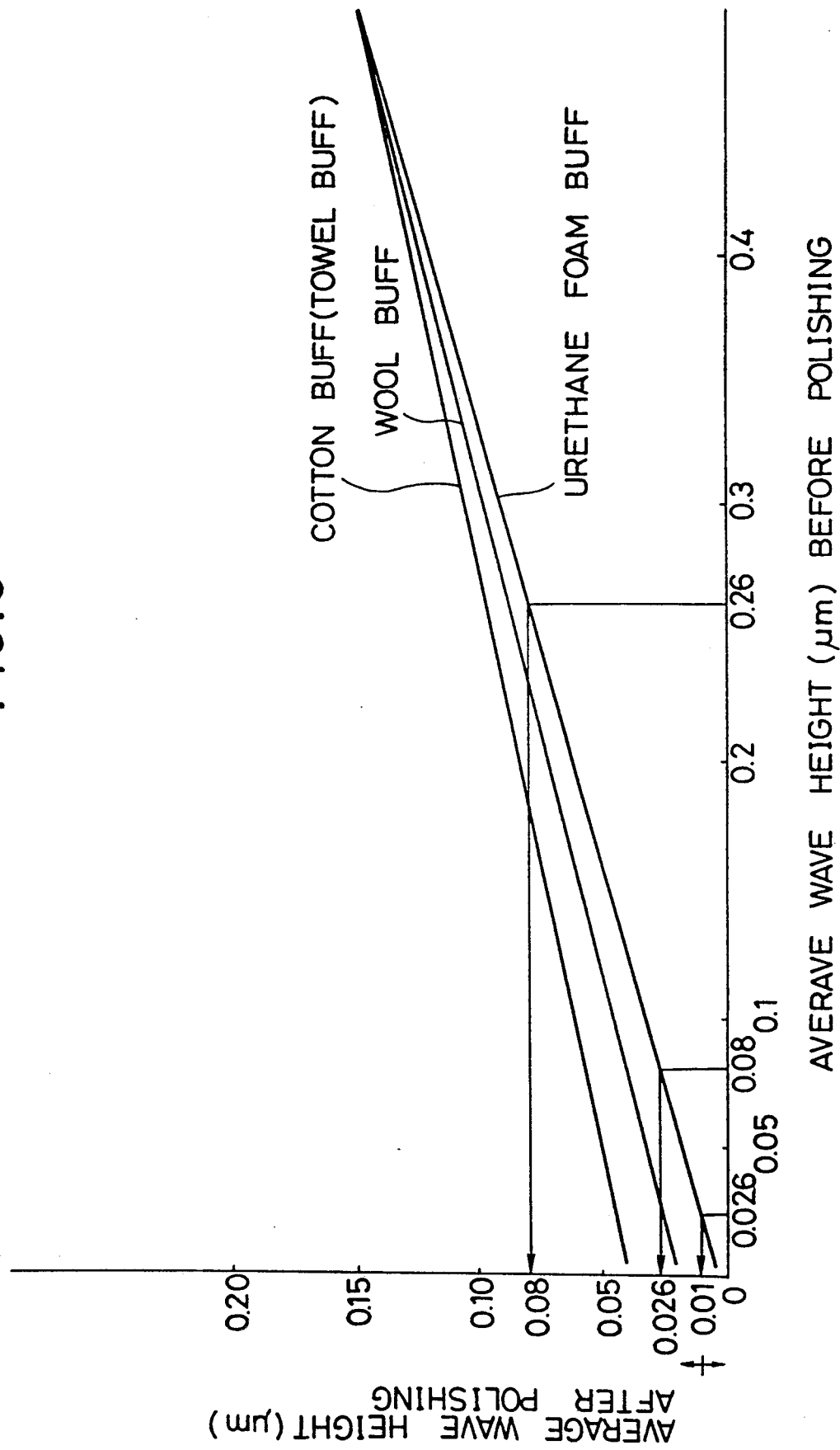
FIG. 6 is a graph showing characteristics exerting an influence of kinds of buffs upon an average wave height on coating surfaces subsequent to a polishing when compared with prior to polishing.

From the results as shown in FIG. 3, it is found that characteristics lines as shown in FIG. 6 showing the relation of the average wave height prior to polishing vs. subsequent to polishing using the urethane foam buff may be produced by plotting the constant average wave heights on the surface of a coating subsequet to polishing and the upper limits of the average wave heights prior to polishing which give the constant average wave heights for each of the particle sizes of the compounds. The characteristics lines for the cotton and wool buffs may be produced as shown in FIG. 6 in substantially the same manner as for the urethane foam buff, using the results produced as shown in FIGS. 4 and 5, respectively.

In the finish rubbing step, the compound is applied directly onto the surface of a coating in order to cut the surface thereof and rubbing a site of scrapes or scratches to a uniform surface of the coating. This action of the compound is not blocked by use of a buff because the compound is not rolled up in the material of the buff, such as cotton, wool or the like. Furthermore, the use of the buff does not permit an irregular repairing of the coating surface.

Figure 8:
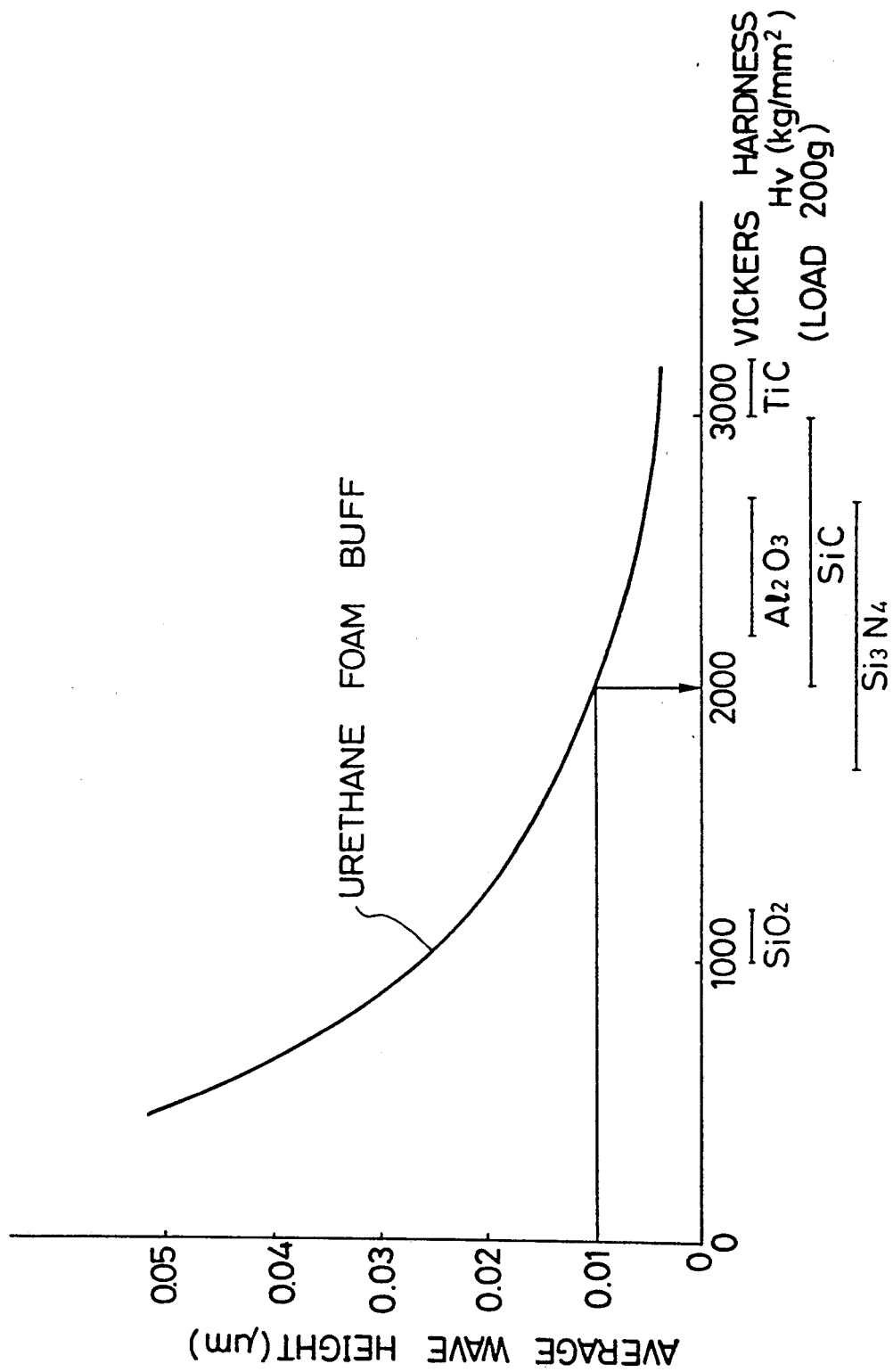
FIG. 8 is a characteristic graph showing a relation of Vickers hardness with an average wave height of the coating surface subsequent to polishing.

As shown in FIG. 8, the compound to be used for the present invention is not restricted to a particular one and it may preferably include, for example, an abrasive agent or a polishing agent, such as aluminum oxide, silicon nitride, silicon carbide, and titanium carbide, in a form of powder. It is preferred that the compound having a particle size ranging from 1 to 7 μm amounts to approximately 50% or more with respect to a total amount thereof.

The compound to be used therefor has a Vickers hardness of Hv 2,000 kg/mm$^2$ or higher. If the Vickers hardness of the compound is below the lower limit, the compound lacks the cutting capacity for cutting a coating surface until an average wave height of normal coatings reaches 0.01 μm. This is supported by the relation of the average wave height of coating film vs. a hardness of the compound as shown in FIG. 8. In FIG. 8, the procedures were the same as those shown in FIG. 3 where a distribution of particle sizes is represented as Dmed or $D_{50}$=1 to 7.5 μm while a maximum particle size is 15 μm FIG. 8 also shows the fact that the harder the compound, the smaller the average wave height on the coating after polishing. It is thus to be understood that the Vickers hardness of the compound of Hv=2,000 kg/mm$^2$ makes the average wave height of the coating film below 0.01 μm.

It is further preferred that the compound has a maximum particle size be as large as approximately 15 μm. When workability is taken into consideration, it is preferred that a time required for polishing is set at 2 minutes per square meter of a coating surface to repair an average wave height of 0.26 μm, which is a surface of a most rough level that can be repaired by the finish rubbing procedure.

Figure 9:
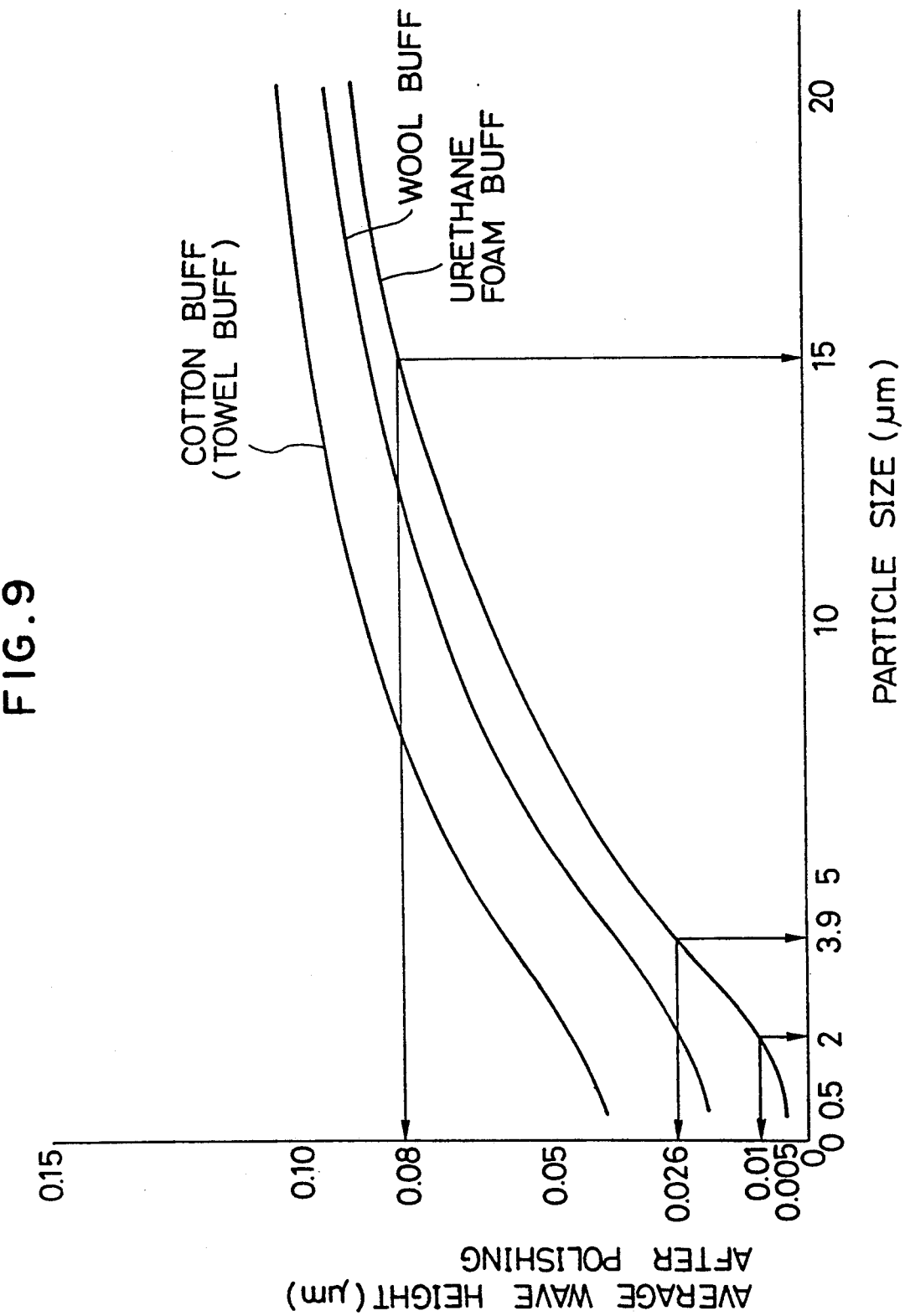
FIG. 9 is a characteristic graph showing a relation of particle sizes of the compound with an average wave height of the coating surface subsequent to polishing.

FIG. 9 shows the relation of the average wave height vs. particle sizes of the compound after polishing from the results as shown in FIGS. 3 to 5. As shown in FIG. 9, it is found that the largest particle size of the compound is required to be approximately 15 μm in order to repair a coating surface having the average wave height of approximately 0.26 μm in 2 minutes per square meter of the coating surface to an average wave height of about 0.08 μm after polishing.

It is to be understood, however, that the maximum particle size of the compound is not restricted to 15 μm and may vary to a wide extent because the largest size of 15 μm is determined on the basis of the polishing time of 2 minutes per square meter of the coating surface. In other words, the maximum particle size may be larger or smaller than 15 μm depending upon a polishing time to be set.

Figure 10:
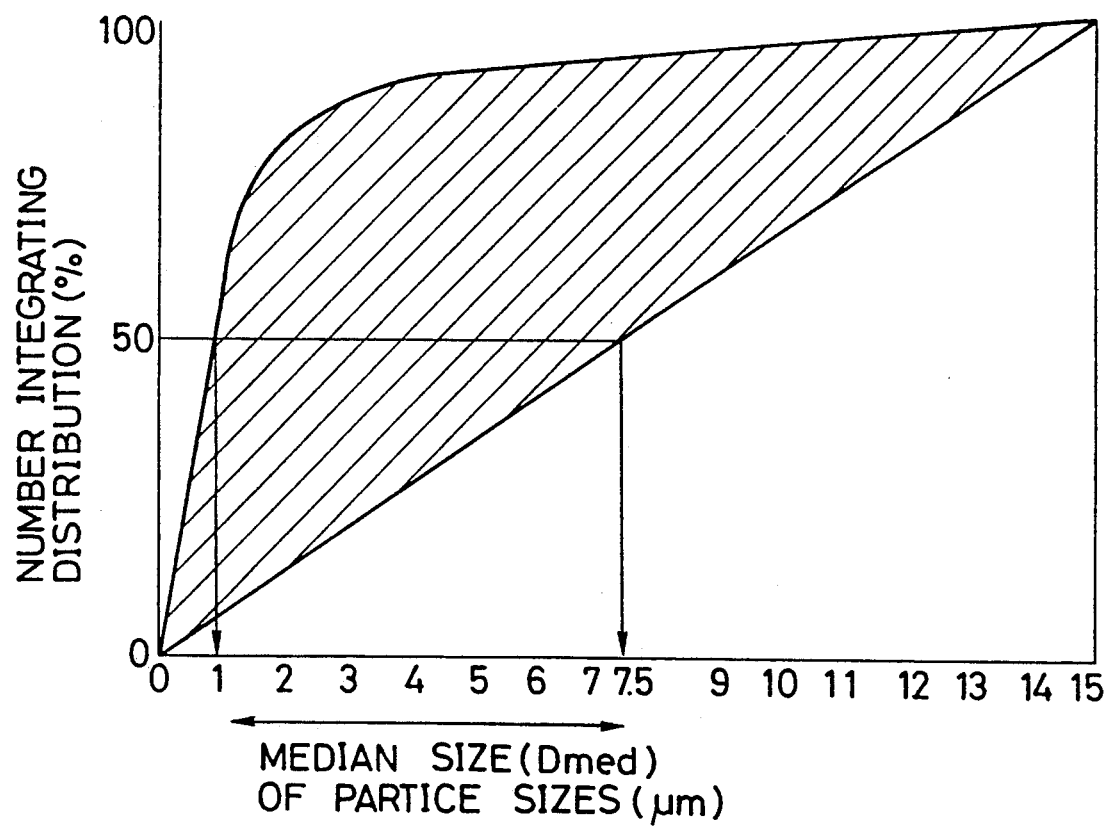
FIG. 10 is a graph showing a number integrating distribution of particle sizes of the compound preferred to provide a normal coating film.

As shown in FIG. 10, it is preferred that a median size, Dmed or $D_{50}$, of particle sizes of the compound be set within the range from 1 to 7.5 μm from the number integrating distribution on the basis of the fact that the maximum particle size of the compound is 15 μm.

In accordance with the present invention, the compound is then pressed using a particular buff at an equal surface pressure within the range from 2 to 20 g per square cm of the coating surface, thereby permitting the compound to cut out the coating surface to a desired average wave height on the coating surface.

Figure 7:
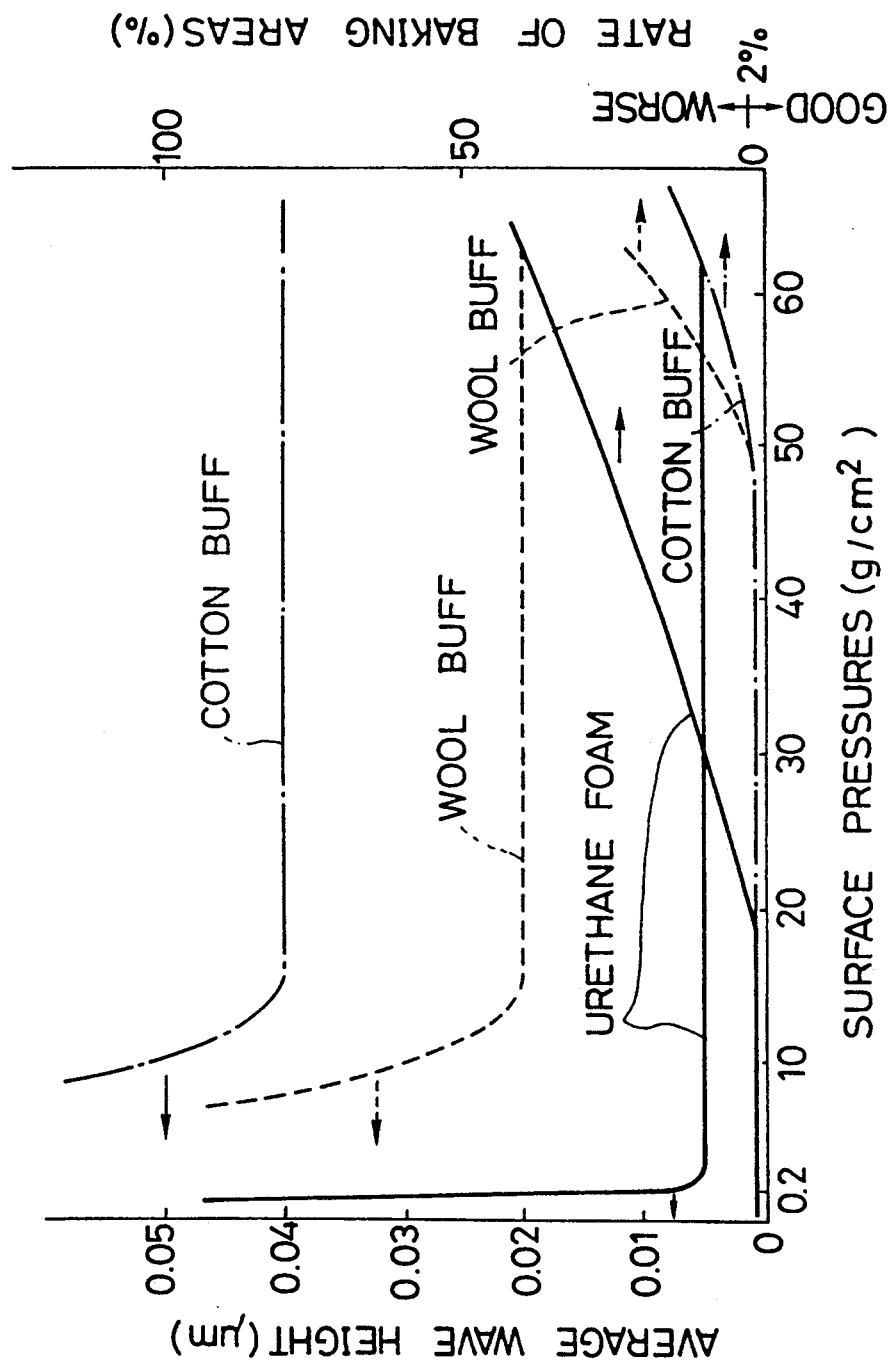
FIG. 7 is a characteristic graph showing a relation of pressures created by pressing a buff on the coating surface with an average wave height on the coating surface subsequent to polishing; and a relation of the pressures with a rate of areas on which the compound is baked.

As shown in FIG. 7 where conditions were the same as in FIGS. 3 to 5 except surface pressures and where Dmed or $D_{50}=1$ to 7.5 and the maximum particle size is 15 μm, it is found that, as the surface pressures vary using a urethane foam buff, a finish on the coating surface is improved to a rapid extent at the surface pressure of around 2 g/cm² and that an average wave height can be reduced to 0.005 μm which is smaller than the average wave height of 0.01 μm on a normal coating surface. It is further to be noted that the average wave height of 0.005 μm can be maintained to substantially the same level as the surface pressure is elevated to higher pressures. However, if the surface pressure exceeds approximately 20 g/cm², it is found that an area in which the compound is baked on the coating film exceeds a rate of approximately 2% that is a limit for the acceptable area. It is thus to be noted that the optimum range of the surface pressures is from 2 to 20 g/cm².

Turning now to FIG. 7 showing influences of surface pressures applied by cotton and wool buffs for reference, it is found that they could not reduce the average wave heights to 0.01 μm or lower, which is an average wave height on a normal coating surface, by varying their pressures applied to the surface.

It is further to be noted that the surface pressures may be applied to the surface of a coating with a buff such as an urethane foam buff, a cotton buff and a wool buff, but the urethane foam buff is preferred.

As shown in FIG. 6, it is found that the urethane foam buff can provide an average wave height on the coating surface after polishing smaller than cotton and wool buffs and achieve a final average wave height of 0.01 μm or lower, while the cotton and wool buffs could not achieve the final average wave height lower than 0.01 μm which is the average wave height on the normal coating surface as shown in FIG. 6.

The present invention may be applied to any kind of coatings and particularly suited for paints to be used for coating vehicle bodies. Such paints may include, for example, acrylic-melamine type clear, alkyd-melamine type solid, urethane type clear, urethane type solid and the like.

The present invention will be described by way of examples with reference to the accompanying drawings.

In the following example, the paper and compound rubbing steps were carried out under conventional conditions while the finish rubbing step was carried out in accordance with the method of the present invention.

In the paper rubbing step, dust as well as fades and sags of the paint were removed by wet rubbing using wet rubbing paper #1000 to #2000.

The compound rubbing step comprising the rough rubbing and intermediate rubbing was carried out using an air type disk polisher and an abrasive powder as the compound.

The rough rubbing was conducted using a rubbing compound ("#100"; Solar K.K.) as the compound for the polishing time at the rate of 2 minutes per square meter at revolutions of the disk ranging from 2,000 to 9,000 rpm. The composition containing the compound was as follows:

| Composition | Rates (%) |
| --- | --- |
| Compound ($Al_2O_3$) | 35 |
| Petroleum type solvent | 20 |
| Purified water | 35 |
| Surfactant | 10 |

The intermediate rubbing was effected using a rubbing compound ("UNICORN FMC-833S"; Ishihara Yakuhin K.K.) for the polishing time at the rate of 2 minutes per square meter at disk revolutions of 2,000 rpm. The composition used was as follows:

| Composition | Rates (%) |
| --- | --- |
| Compound ($Al_2O_3$) | 30 |
| Petroleum type solvent | 20 |
| Purified water | 40 |
| Surfactant | 10 |

The coating surface that had been treated by the intermediate rubbing step was then subjected to finish rubbing.

Figure 2:
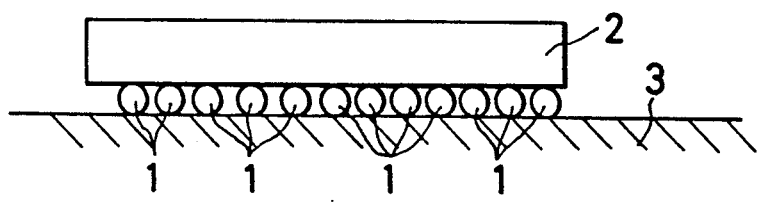
FIG. 2 is a diagram showing a manner of finish rubbing according to the present invention.

As shown in FIG. 2, the finish rubbing was effected by pressing the coating surface 3 through the compound 1 with the buff 2 as a pressing means, thus permitting the compound 1 alone to rub the coating surface 3. As the buff was used a urethane foam buff. The finish rubbing was conducted in which the surface 3 of a coating (alkyd-melamine; black in color) was polished using $Al_2O_3$ and an air type disk polisher. The composition containing the compound was as follows:

| Composition | Rates (%) |
| --- | --- |
| Compound ($Al_2O_3$) | 10 |
| Petroleum type solvent | 30 |
| Purified water | 59 |
| Surfactant | 1 |

It has been found that the structure as shown in FIG. 2 can press the coating surface 3 at equally constant pressures to thereby allow the compound 1 alone to act directly on the coating surface 3 without causing the buff 2 to act thereon, thus permitting cutting or repairing the coating surface to an average wave height as low as 0.01 μm, that is the one for a normal coating. This structure may prevent the compound 1 from being rolled in the buff 2 and as a consequence acting thereon in an irregular manner scratching the coating surface 3.

The results is shown in FIG. 3 where the finish rubbing on the surface of a coating with an alkyd-urethane solid paint was conducted by pressing the compound ($Al_2O_3$) having a Vickers hardness of Hv 2,300 kg/mm$^2$ with the urethane foam buff at the pressing pressure of 20 g/cm$^2$ for the polishing time of 2 minutes per m$^2$ of the coating surface and using the polisher at revolutions of 2,000 rpm. The results as shown in FIGS. 4 and 5 were likewise produced by means of the test procedures in the same manner as in FIG. 3 using the cotton buff and the wool buff, respectively.

As have been described hereinabove, the coating surface with scrapes and/or scratches can be repaired to a coating surface of high quality without causing any fade of a paint coated on a vehicle body.

The present invention may be embodied in other specific forms without departing from the spirit and scope thereof. The present embodiments as have been described hereinabove are therefore to be considered in all respects as illustrative and not restrictive, the scope of the invention being indicated by the appended claims, and all the changes, modifications and variations which come within the meaning and range of equivalency of the claims are therefore intended to be encompassed within the spirit and scope of the invention.

What is claimed is:

1. A method for repairing the surface of a coating comprising:

a step of rubbing a compound having a Vickers hardness Hv about 2,000 kg/mm$^2$ on the surface thereof at a uniform surface pressure ranging from 2 to 20 g/cm$^2$ with a urethane foam buff;

wherein the compound is in the form of a powder comprising particles having a median particle size ranging from 1 to 7 μm which amount to 50% or higher of the total amount of the compound, and the maximum particle size of the compound is 15 μm.

2. A method as claimed in claim 1, wherein said compound is aluminum oxide, silicon carbide, silicon nitride or titanium carbide.

3. A method as claimed in claim 1, wherein a first rubbing step is provided prior to said step, in which a compound having a median particle size larger than said compound in said step is sued.

4. A method as claimed in claim 3, wherein a second rubbing step is further provided prior to said first rubbing step, said second rubbing step being carried out using a compound having a median particle size larger than that used in said first rubbing step.

5. A method as claimed in claim 1, wherein said buff rotates.

6. A method as claimed in claim 1, wherein first and second rubbing steps are carried out in order prior to said step, the first rubbing step being carried out using a compound having a particle larger than that used in the second rubbing step.

* * * * *